(12) United States Patent
Rickis

(10) Patent No.: US 8,511,330 B1
(45) Date of Patent: Aug. 20, 2013

(54) SERVO MINIMUM PRESSURE VALVE

(75) Inventor: Aaron Rickis, Feeding Hills, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/456,475

(22) Filed: Apr. 26, 2012

(51) Int. Cl.
*F16K 11/07* (2006.01)

(52) U.S. Cl.
USPC ............... 137/15.21; 137/625.3; 137/625.38; 251/206

(58) Field of Classification Search
USPC ............. 251/205–206, 210–211; 137/15.21, 137/625.3, 625.38
See application file for complete search history.

(56) References Cited

U.S. PATENT DOCUMENTS

| | | | | |
|---|---|---|---|---|
| 2,836,198 | A * | 5/1958 | McNeill | 251/206 |
| 2,964,023 | A * | 12/1960 | Meulendyk | 137/625.39 |
| 3,380,467 | A * | 4/1968 | Diehl, Jr. et al. | 222/57 |
| 4,109,683 | A * | 8/1978 | Strache | 137/625.3 |
| 4,215,723 | A | 8/1980 | Ichiryu et al. | |
| 4,325,412 | A * | 4/1982 | Hayner | 137/625.65 |
| 4,637,420 | A | 1/1987 | Dyer | |
| 5,070,898 | A | 12/1991 | Jagodzinski et al. | |
| 6,397,890 | B1 * | 6/2002 | Mickelson et al. | 137/625.34 |
| 6,401,446 | B1 | 6/2002 | Gibbons | |
| 6,666,015 | B2 | 12/2003 | Dyer | |
| 2004/0025492 | A1 | 2/2004 | Griffiths et al. | |
| 2007/0199601 | A1 * | 8/2007 | Imhof | 137/625.64 |
| 2008/0035225 | A1 * | 2/2008 | Tackes et al. | 137/625.35 |
| 2008/0296403 | A1 | 12/2008 | Futa, Jr. et al. | |
| 2011/0023982 | A1 | 2/2011 | Griffiths | |

OTHER PUBLICATIONS

Ni, et al., Compensation Force CFD Analysis of Pressure Regulating Valve Applied in FMU of Engine and System Controls, 2011-01-2641, Copyright 2011 SAE International, 7 pages.
Anderson, et al., Mathematical Modelin of a Two Spool Flow Control Servolvalue Using a Pressure Control Pilot, Transactions of the ASME, Copyright 2002 by ASME, vol. 124, Sep. 2002, pp. 420-427.

* cited by examiner

*Primary Examiner* — John Bastianelli
(74) *Attorney, Agent, or Firm* — Cantor Colburn LLP

(57) ABSTRACT

A servo minimum pressure valve assembly includes a servo minimum pressure sleeve and a servo minimum pressure valve spool. The servo minimum pressure sleeve includes an inlet aperture, a first window set, a second window set, and a third window set. A ratio of an outlet window diameter of the first window set to an outlet window diameter of the second window set is between 2.34 and 2.65. The outlet window diameter of the second window set is greater than an outlet window diameter of the third window set. The servo minimum pressure valve spool is configured to move bi-directionally along a longitudinal axis of the servo minimum pressure valve sleeve. The servo minimum pressure valve spool includes a cylindrical portion to control a fluid flow between the inlet aperture of the servo minimum pressure sleeve and the first, second, and third window sets of the servo minimum pressure sleeve.

20 Claims, 5 Drawing Sheets

SERVO MINIMUM PRESSURE VALVE

BACKGROUND OF THE INVENTION

The present invention is related to fuel flow control, and more specifically to a servo minimum pressure valve.

Fuel flow control in systems such as gas turbines includes controlling and maintaining pressures within a fuel control housing of a fuel control. To control and maintain pressures within the fuel control housing, often the fuel flow is increased and decreased as well as diverted via a combination of control valves. A displacement pump pressurizes fuel prior to its metering and subsequent delivery to an engine. The displacement pump is typically sized to ensure an excess flow capacity at all possible operating conditions. The output of the pump is delivered to a fuel metering valve which, in conjunction with a bypassing, pressure regulating valve (PRV), meters the rate of fuel burn flow to the engine. The fuel control can also provide fluid pressure for actuators. Fluid pressure for the actuators is controlled and excess flow can be discharged to the PRV. Proper control of a fuel system is based on the consistent operation of all valves within the fuel system. Without consistent valve operation, the fuel system may become unpredictable.

BRIEF DESCRIPTION OF THE INVENTION

Exemplary embodiments include a servo minimum pressure valve assembly that includes a servo minimum pressure sleeve and a servo minimum pressure valve spool. The servo minimum pressure sleeve includes an inlet aperture, a first window set, a second window set, and a third window set. A ratio of an outlet window diameter of the first window set to an outlet window diameter of the second window set is between 2.34 and 2.65. The outlet window diameter of the second window set is greater than an outlet window diameter of the third window set. The servo minimum pressure valve spool is configured to move bi-directionally along a longitudinal axis of the servo minimum pressure valve sleeve. The servo minimum pressure valve spool includes a cylindrical portion to control a fluid flow between the inlet aperture of the servo minimum pressure sleeve and the first, second, and third window sets of the servo minimum pressure sleeve.

Additional exemplary embodiments include fuel control that includes a pressure regulating valve section configured to control a metered pressure of fuel flow and a servo minimum pressure valve section configured to establish a minimum servo pressure and discharge excess flow to the pressure regulating valve section. The servo minimum pressure valve section includes a servo minimum pressure valve assembly that includes a servo minimum pressure sleeve and a servo minimum pressure valve spool. The servo minimum pressure sleeve includes an inlet aperture, a first window set, a second window set, and a third window set. A ratio of an outlet window diameter of the first window set to an outlet window diameter of the second window set is between 2.34 and 2.65. The outlet window diameter of the second window set is greater than an outlet window diameter of the third window set. The servo minimum pressure valve spool is configured to move bi-directionally along a longitudinal axis of the servo minimum pressure valve sleeve. The servo minimum pressure valve spool includes a cylindrical portion to control a fluid flow between the inlet aperture of the servo minimum pressure sleeve and the first, second, and third window sets of the servo minimum pressure sleeve.

Further exemplary embodiments include a method of installing a servo minimum pressure valve assembly in a fuel control. The method includes inserting a servo minimum pressure valve sleeve into a servo minimum pressure valve section of a fuel control housing. The servo minimum pressure valve sleeve includes an inlet aperture, a first window set, a second window set, and a third window set. A ratio of an outlet window diameter of the first window set to an outlet window diameter of the second window set is between 2.34 and 2.65. The outlet window diameter of the second window set is greater than an outlet window diameter of the third window set. The method also includes arranging a servo minimum pressure valve spool within the servo minimum pressure valve sleeve. The servo minimum pressure valve spool includes a limiting lip and a cylindrical portion. The servo minimum pressure valve spool is arranged to establish a diametral clearance of 0.0003 and 0.0005 inches (0.000762-0.00127 cm) between an inner diameter of the servo minimum pressure valve sleeve and an outer diameter of the cylindrical portion of the servo minimum pressure valve spool. The method further includes coupling a resilient member to the servo minimum pressure valve spool in the servo minimum pressure valve section of the fuel control housing. The resilient member forces the limiting lip of the servo minimum pressure valve spool into contact with the limiting lip of the servo minimum pressure valve sleeve.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
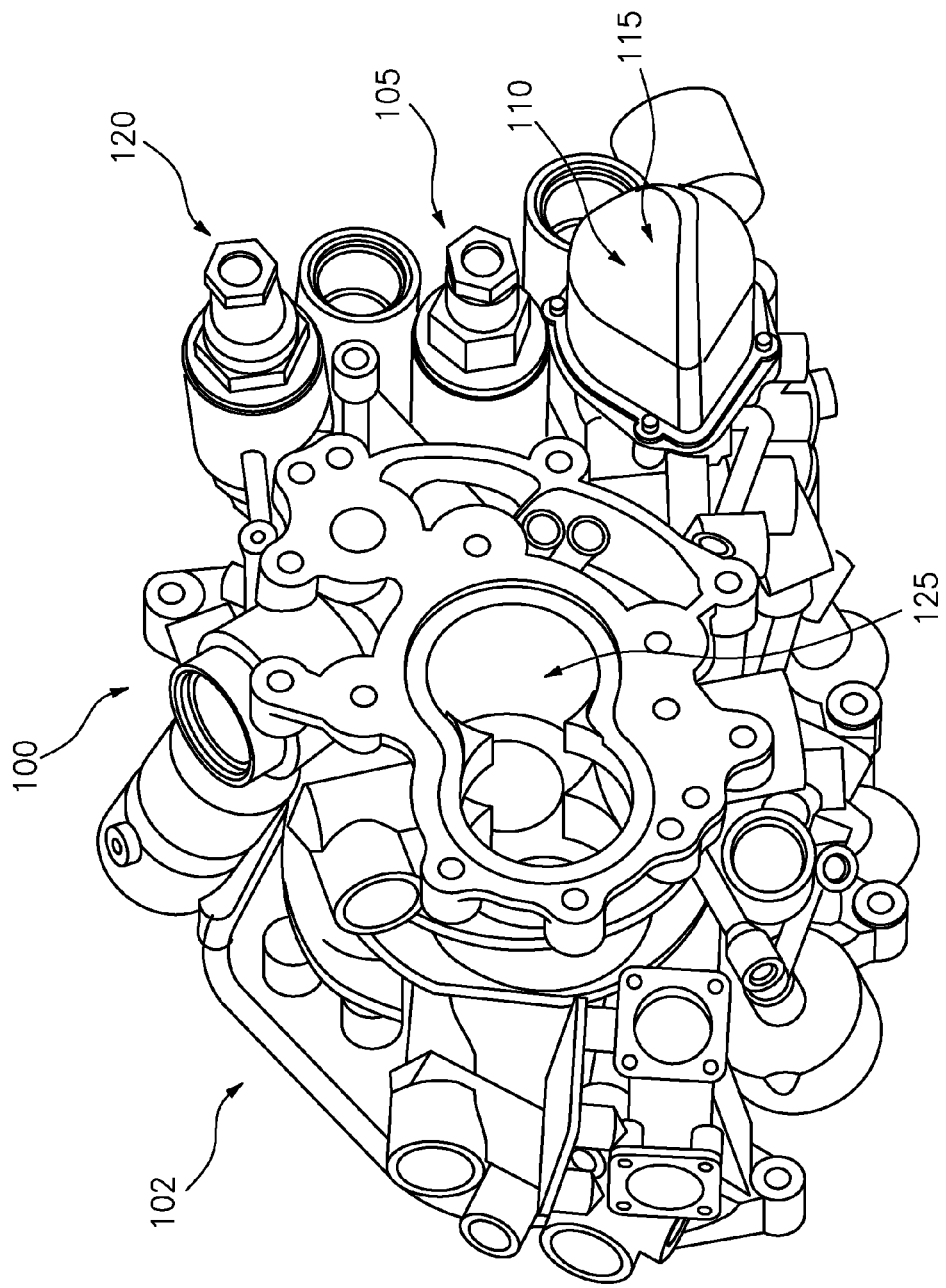
FIG. 1 schematically illustrates a perspective view of a fuel control housing portion for regulating fuel flow.

FIG. 1 schematically illustrates a perspective view of a fuel control housing portion 100 of a fuel control 102 for regulating fuel flow for systems such as aircraft gas turbine engines. In one embodiment, the fuel control housing portion 100 includes a pressure regulating valve section 105, a metering valve section 110, a containment housing section 115 that is generally adjacent to the metering valve section 110, and a servo minimum pressure valve section 120. Other valves, control and feedback features (not depicted) may also be included in the fuel control housing portion 100 or in another portion (not depicted) of the fuel control 102. For example, a separate servo pump may be included in the fuel control 102 to generate a servo pressure. Fuel flowing into the fuel control housing portion 100 is pressurized in a pump section 125. Pressurized flow is metered in metering valve section 110 before being output as a fuel burn flow at a metered pressure. The pressure regulating valve section 105 sets and controls the metered pressure of the metering valve section 110. The fuel control 102 can also provide fluid pressure for actuators (not depicted), where the servo minimum pressure valve section 120 establishes a minimum servo pressure and discharges excess flow to the pressure regulating valve section 105.

Figure 2:
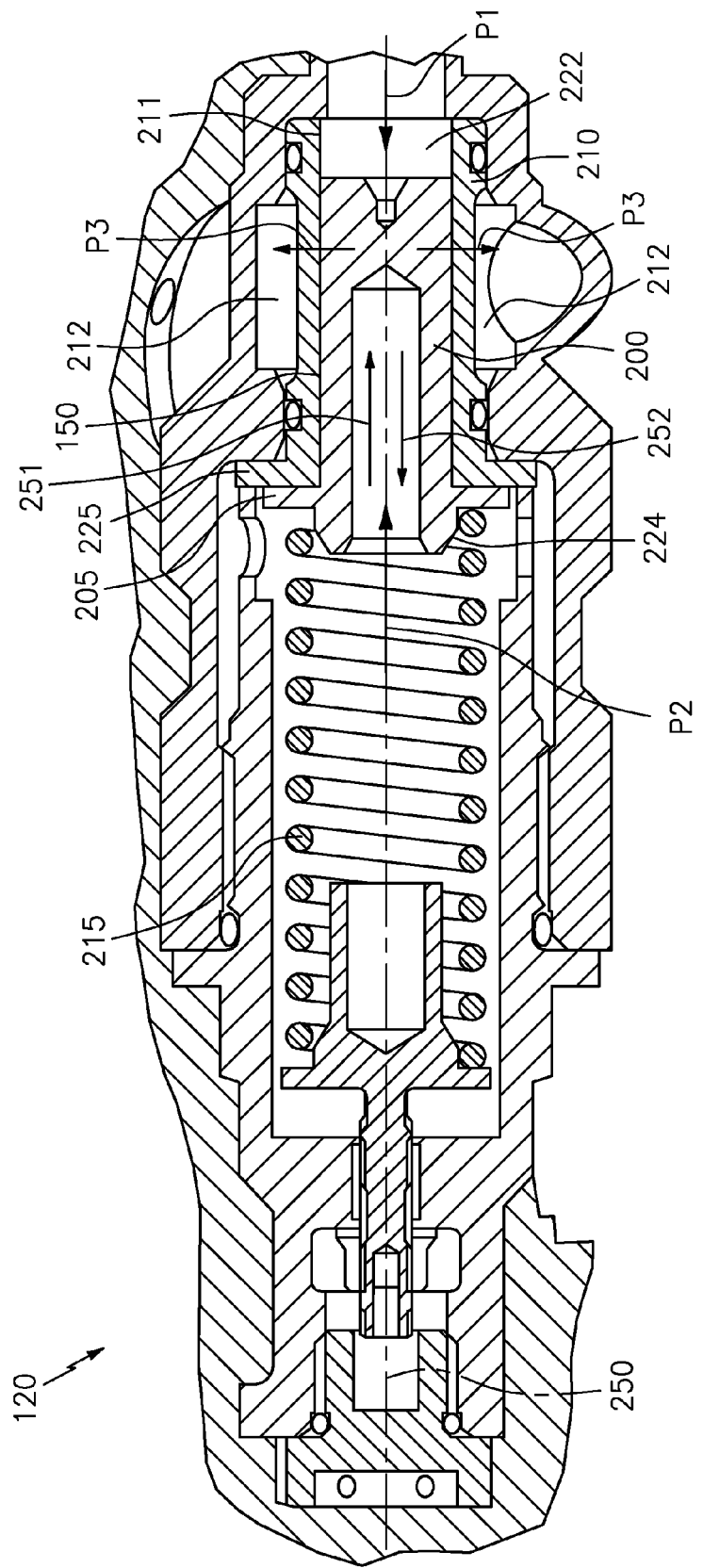
FIG. 2 schematically illustrates a cross-sectional view of a servo minimum pressure valve section of the fuel control housing portion of FIG. 1.

FIG. 2 schematically illustrates a cross-sectional view of the servo minimum pressure valve section 120 of FIG. 1 including a servo minimum pressure valve assembly 150. The servo minimum pressure valve assembly 150 includes a servo minimum pressure valve spool 200 arranged within a servo minimum pressure valve sleeve 210. The servo minimum pressure valve sleeve 210 includes an inlet aperture 211 and a first window set 212. In a valve-closed configuration, the servo minimum pressure valve spool 200 blocks fuel flow from the inlet aperture 211 of the servo minimum pressure valve sleeve 210 to the first window set 212. In a valve-open configuration, the servo minimum pressure valve spool 200 is shifted in position such that fuel can flow from the inlet aperture 211 at an inlet pressure P1 to the first window set 212 at a discharge pressure P3. In operation, the servo minimum pressure valve spool 200 is immersed in fuel, where a difference in fuel pressure between inlet pressure P1 and pressure P2 forces the servo minimum pressure valve spool 200 to move bi-directionally along longitudinal axis 250 as indicated by arrows 251, 252. The servo minimum pressure valve sleeve 210 remains fixed with respect to the servo minimum pressure valve section 120.

The servo minimum pressure valve spool 200 is coupled to a resilient member 215 (e.g., a spring). The force of inlet pressure P1 at spool end 222 must be greater than the combined force of pressure P2 at spool end 224 plus a spring load force of the resilient member 215 to move the servo minimum pressure valve spool 200 from a closed position to an open position. Movement of the servo minimum pressure valve spool 200 within the servo minimum pressure valve sleeve 210 in the direction of arrow 251 may be limited by a limiting lip 205 of servo minimum pressure valve spool 200 and a limiting lip 225 of servo minimum pressure valve sleeve 210.

Figure 3A:
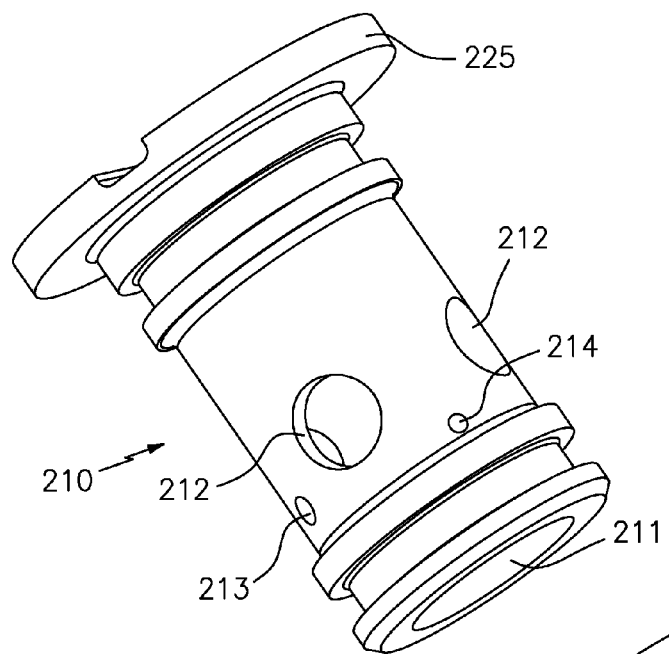
FIG. 3 illustrates a perspective view of a servo minimum pressure valve spool and a servo min pressure valve sleeve of FIG. 2.
Figure 3B:
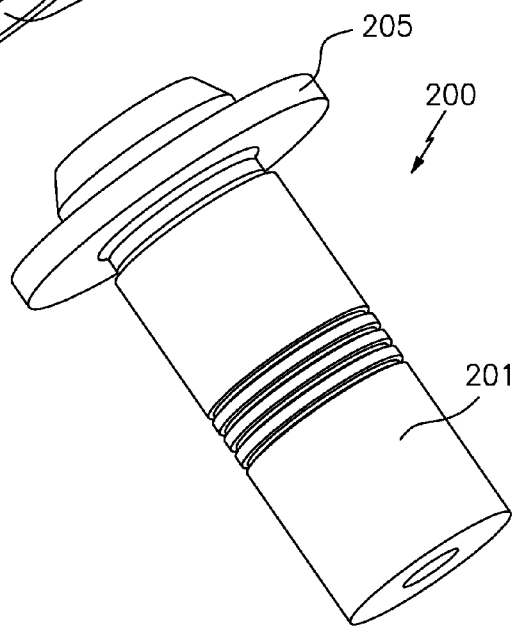
Figure 3C:
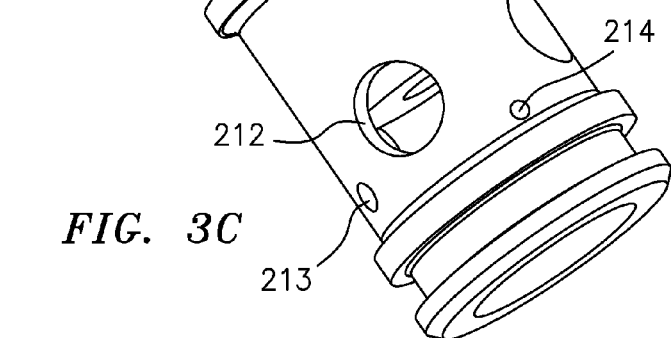

FIG. 3 illustrates a perspective view of the servo minimum pressure valve spool 200 in isolation and the servo minimum pressure valve sleeve 210 in isolation. FIG. 3 further illustrates a perspective view of the servo minimum pressure valve spool 200 and the servo minimum pressure valve sleeve 210 in a concentric arrangement. In one embodiment, the servo minimum pressure valve spool 200 includes a cylindrical portion 201. In one embodiment, the servo minimum pressure valve sleeve 210 includes a second window set 213 and a third window set 214 in addition to the first window set 212. The cylindrical portion 201 controls a fluid flow, such as fuel flow, between the inlet aperture 211 of the servo minimum pressure sleeve 210 and the first, second, and third window sets 212, 213, 214 of the servo minimum pressure sleeve 210.

Figure 4:
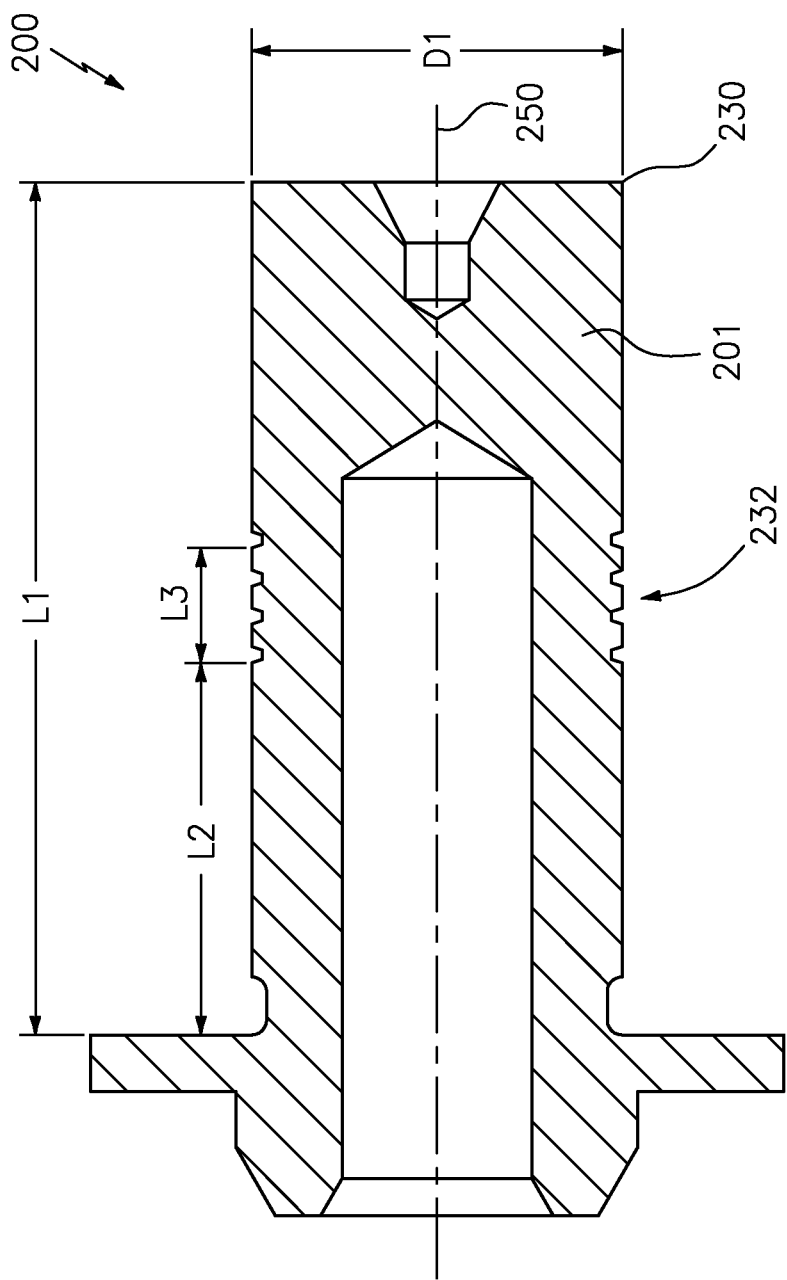
FIG. 4 schematically illustrates a cross-sectional view of the servo minimum pressure valve spool of FIG. 2.

FIG. 4 depicts additional details of the servo minimum pressure valve spool 200 in a cross-sectional view according to an embodiment. The cylindrical portion 201 of the servo minimum pressure valve spool 200 has an outer diameter D1 of at least 0.484 inches (1.23 cm). The servo minimum pressure valve spool 200 has a length L1 from limiting lip 205 to end 230 of about 1.11 inches (2.82 cm). The servo minimum pressure valve spool 200 includes four grooves 232. The grooves 232 are formed at a length L2 of about 0.484 inches (1.23 cm) from limiting lip 205 and span a length of about 0.15 inches (0.38 cm). A ratio of L1:L2 is between 2.26 and 2.32.

Figure 5:
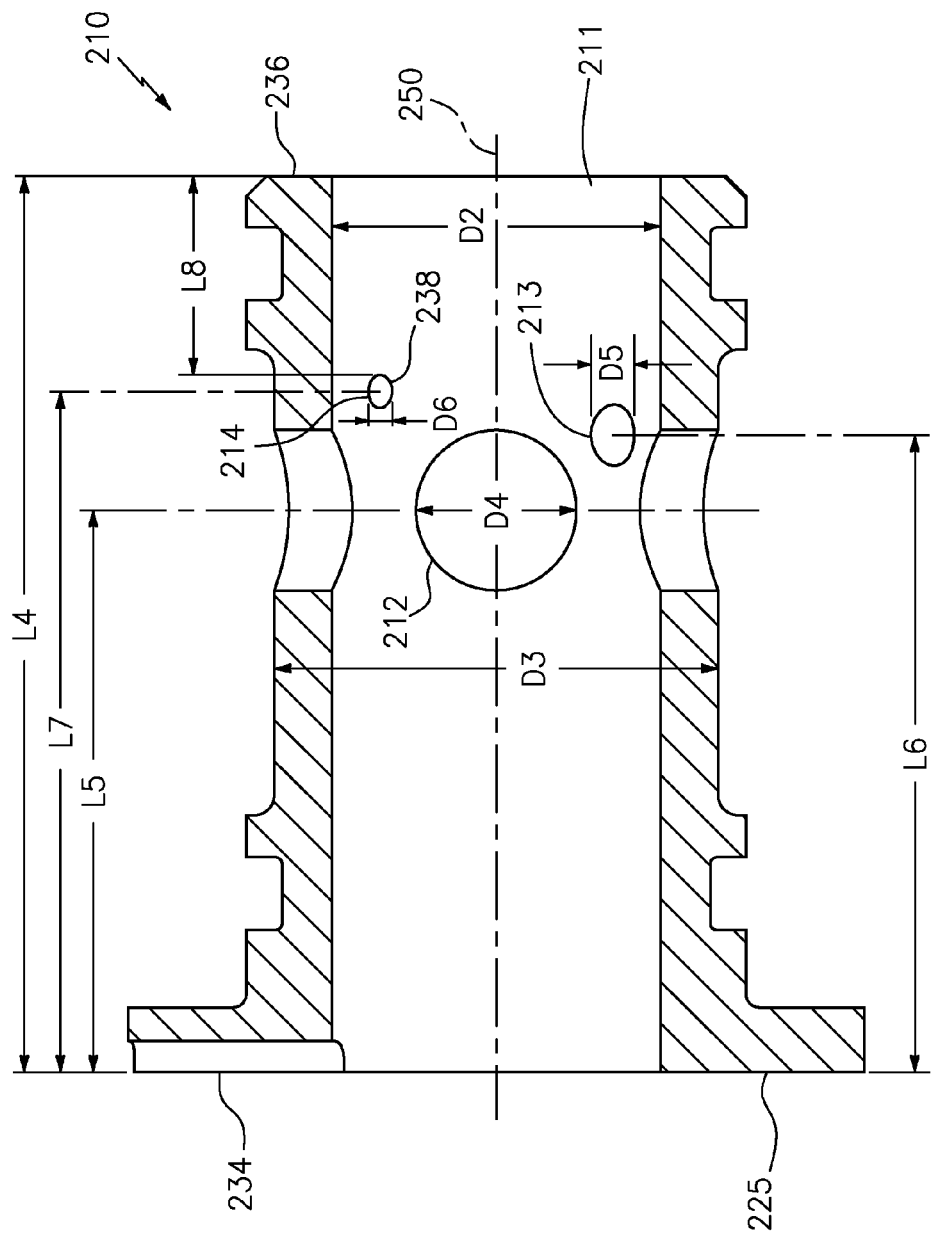
FIG. 5 schematically illustrates a cross-sectional view of the servo minimum pressure valve sleeve of FIG. 2.

FIG. 5 depicts further details of the servo minimum pressure valve sleeve 210 in a cross-sectional view according to an embodiment. The servo minimum pressure valve sleeve 210 has an internal diameter D2 of a maximum of 0.487 inches (1.24 cm). A diametral clearance of 0.0003-0.0005 inches (0.000762-0.00127 cm) is maintained between internal diameter D2 of servo minimum pressure valve sleeve 210 and outer diameter D1 of servo minimum pressure valve spool 200 of FIG. 4 for each matched set of the servo minimum pressure valve spool 200 and the servo minimum pressure valve sleeve 210. The servo minimum pressure valve sleeve 210 has an outer diameter D3 of about 0.655 inches (1.66 cm) and a length L4 from a face 234 of the limiting lip 225 to an inlet-side end 236 of about 1.318 inches (3.35 cm).

In an embodiment, the servo minimum pressure valve sleeve 210 includes four substantially equal spaced outlet windows in the first window set 212, each formed at a length L5 of about 0.826 inches (2.10 cm) from the face 234 of the limiting lip 225 and having an outlet window diameter D4 of about 0.234 inches (0.59 cm). The second window set 213 includes a pair of substantially equal spaced outlet windows offset about 45 degrees relative to an outlet window of the first window set 212. The third window set 214 includes a pair of substantially equal spaced outlet windows offset about 45 degrees relative to an outlet window of the first window set 212 and offset about 90 degrees relative to an outlet window of the second window set 213. Each outlet window in the second window set 213 is formed at a length L6 of about 0.936 inches (2.38 cm) from the face 234 of the limiting lip 225 and has an outlet window diameter D5 of about 0.094 inches (0.239 cm). Each outlet window in the third window set 214 is formed at a length L7 of about 1.00 inch (2.54 cm) from the face 234 of the limiting lip 225 and has an outlet window diameter D6 of about 0.047 inches (0.119 cm). An inlet-side edge 238 of the third window set 214 is at a length L8 of about 0.359 inches (0.911 cm) from the inlet-side end 236 of the servo minimum pressure valve sleeve 210. A ratio of internal diameter D2 to length L8 is between 1.32 and 1.39. A ratio of outlet window diameter D4 to outlet window diameter D5 is between 2.34 and 2.65. A ratio of outlet window diameter D5 to outlet window diameter D6 is between 1.83 and 2.18.

Accordingly, a relationship between the outlet window diameters D4, D5, and D6 is D4>D5>D6. The diameter differential allows a fuel flow from inlet pressure P1 to discharge pressure P3 of FIG. 2 to be controlled by increasing the diameter of the outlet windows to allow the fuel flow as the servo minimum pressure valve spool 200 moves in direction 252 of FIG. 2. As can be seen in FIG. 5, the first window set 212 is axially closer to the limiting lip 225 of the servo minimum pressure valve sleeve 210 than the second window set 213, and the second window set 213 is axially closer to the limiting lip 225 of the servo minimum pressure valve sleeve 210 than the third window set 214 (L5<L6<L7). The diameter differential of the window sets 212, 213, and 214 allows a relatively smaller fuel flow to commence followed by an increased fuel flow as the third window set 214 is initially exposed, then as second window set 213 is exposed, and finally as the first window set 212 is exposed. As such, adjustments to the position of the servo minimum pressure valve spool 200 relative to the window sets 212, 213, 214 enables adjustment of the fuel flow to maintain a minimum servo pressure. The servo minimum pressure valve spool 200 and the servo minimum pressure valve sleeve 210 operate together to bypass excess servo pump flow from the servo minimum pressure valve section 120 to the pressure regulating valve section 105 of FIG. 1 and maintain a minimum servo pressure for fueldraulic actuators (not depicted).

In an embodiment, the servo minimum pressure valve assembly 150 of FIG. 2 can be installed in fuel control 102 of FIG. 1 by inserting servo minimum pressure valve sleeve 210 into servo minimum pressure valve section 120 of the fuel control housing portion 100. Servo minimum pressure valve spool 200 is arranged within the servo minimum pressure valve sleeve 210 to establish a diametral clearance of 0.0003 and 0.0005 inches (0.000762-0.00127 cm) between the internal diameter D2 of the servo minimum pressure valve sleeve 210 and the outer diameter D1 of the servo minimum pressure valve spool 200. Resilient member 215 is coupled to servo minimum pressure valve spool 200 in the servo minimum pressure valve section 120 of the fuel control housing portion 100, forcing the limiting lip 205 of the servo minimum pressure valve spool 200 into contact with the limiting lip 225 of the servo minimum pressure valve sleeve 210 as an initial spring load force to be overcome for the servo minimum pressure valve spool 200 to move along longitudinal axis 250.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of installing a servo minimum pressure valve assembly in a fuel control, the method comprising:
   inserting a servo minimum pressure valve sleeve into a servo minimum pressure valve section of a fuel control housing, the servo minimum pressure valve sleeve comprising: an inlet aperture, a first window set, a second window set, and a third window set, wherein a ratio of an outlet window diameter of the first window set to an outlet window diameter of the second window set is between 2.34 and 2.65, and the outlet window diameter of the second window set is greater than an outlet window diameter of the third window set;
   arranging a servo minimum pressure valve spool within the servo minimum pressure valve sleeve, the servo minimum pressure valve spool comprising a limiting lip and a cylindrical portion, the servo minimum pressure valve spool arranged to establish a diametral clearance of 0.0003 and 0.0005 inches (0.000762-0.00127 cm) between an inner diameter of the servo minimum pressure valve sleeve and an outer diameter of the cylindrical portion of the servo minimum pressure valve spool; and
   coupling a resilient member to the servo minimum pressure valve spool in the servo minimum pressure valve section of the fuel control housing, the resilient member forcing the limiting lip of the servo minimum pressure valve spool into contact with the limiting lip of the servo minimum pressure valve sleeve.

2. A servo minimum pressure valve assembly comprising:
   a servo minimum pressure sleeve comprising: an inlet aperture, a first window set, a second window set, and a third window set, wherein a ratio of an outlet window diameter of the first window set to an outlet window diameter of the second window set is between 2.34 and 2.65, and the outlet window diameter of the second window set is greater than an outlet window diameter of the third window set; and
   a servo minimum pressure valve spool configured to move bi-directionally along a longitudinal axis of the servo minimum pressure valve sleeve, the servo minimum pressure valve spool comprising a cylindrical portion to control a fluid flow between the inlet aperture of the servo minimum pressure sleeve and the first, second, and third window sets of the servo minimum pressure sleeve.

3. The servo minimum pressure valve assembly of claim 2, wherein a ratio of the outlet window diameter of the second window set to the outlet window diameter of the third window set is between 1.83 and 2.18.

4. The servo minimum pressure valve assembly of claim 2, wherein the servo minimum pressure valve sleeve has an internal diameter between 0.0003 and 0.0005 inches (0.000762-0.00127 cm) greater than an outer diameter of the cylindrical portion of the servo minimum pressure valve spool.

5. The servo minimum pressure valve assembly of claim 2, further comprising a limiting lip formed on the servo minimum pressure valve spool and a limiting lip formed on the servo minimum pressure valve sleeve, the limiting lips configured to limit movement of the servo minimum pressure valve spool relative to the servo minimum pressure valve sleeve along the longitudinal axis.

6. The servo minimum pressure valve assembly of claim 5, wherein the first window set is axially closer to the limiting lip of the servo minimum pressure valve sleeve than the second window set.

7. The servo minimum pressure valve assembly of claim 6, wherein the second window set is axially closer to the limiting lip of the servo minimum pressure valve sleeve than the third window set.

8. The servo minimum pressure valve assembly of claim 5, wherein the first window set comprises four outlet windows substantially equally spaced from the limiting lip of the servo minimum pressure valve sleeve.

9. The servo minimum pressure valve assembly of claim 5, wherein the second window set comprises a pair of outlet windows substantially equally spaced from the limiting lip of the servo minimum pressure valve sleeve.

10. The servo minimum pressure valve assembly of claim 5, wherein the third window set comprises a pair of outlet windows substantially equally spaced from the limiting lip of the servo minimum pressure valve sleeve.

11. The servo minimum pressure valve assembly of claim 2, wherein a length is defined between an inlet-side edge of the third window set and an inlet-side end of the servo minimum pressure valve sleeve, and a ratio of an internal diameter of the servo minimum pressure valve sleeve to the length is between 1.32 and 1.39.

12. A fuel control, comprising:
   a pressure regulating valve section configured to control a metered pressure of fuel flow; and
   a servo minimum pressure valve section configured to establish a minimum servo pressure and discharge excess flow to the pressure regulating valve section, the servo minimum pressure valve section including a servo minimum pressure valve assembly comprising:
      a servo minimum pressure sleeve comprising: an inlet aperture, a first window set, a second window set, and a third window set, wherein a ratio of an outlet window diameter of the first window set to an outlet window diameter of the second window set is between 2.34 and 2.65, and the outlet window diameter of the second window set is greater than an outlet window diameter of the third window set; and
      a servo minimum pressure valve spool configured to move bi-directionally along a longitudinal axis of the servo minimum pressure valve sleeve, the servo minimum pressure valve spool comprising a cylindrical portion to control a fluid flow between the inlet aperture of the servo minimum pressure sleeve and the first, second, and third window sets of the servo minimum pressure sleeve.

13. The fuel control of claim 12, wherein a ratio of the outlet window diameter of the second window set to the outlet window diameter of the third window set is between 1.83 and 2.18.

14. The fuel control of claim 12, wherein the servo minimum pressure valve sleeve has an internal diameter between 0.0003 and 0.0005 inches (0.000762-0.00127 cm) greater than an outer diameter of the cylindrical portion of the servo minimum pressure valve spool.

15. The fuel control of claim 12, further comprising a limiting lip formed on the servo minimum pressure valve spool and a limiting lip formed on the servo minimum pressure valve sleeve, the limiting lips configured to limit movement of the servo minimum pressure valve spool relative to the servo minimum pressure valve sleeve along the longitudinal axis.

16. The fuel control of claim 15, wherein the first window set is axially closer to the limiting lip of the servo minimum pressure valve sleeve than the second window set, and the second window set is axially closer to the limiting lip of the servo minimum pressure valve sleeve than the third window set.

17. The fuel control of claim 15, wherein the first window set comprises four outlet windows substantially equally spaced from the limiting lip of the servo minimum pressure valve sleeve.

18. The fuel control of claim 15, wherein the second window set comprises a pair of outlet windows substantially equally spaced from the limiting lip of the servo minimum pressure valve sleeve.

19. The fuel control of claim 15, wherein the third window set comprises a pair of outlet windows substantially equally spaced from the limiting lip of the servo minimum pressure valve sleeve.

20. The fuel control of claim 12, wherein a length is defined between an inlet-side edge of the third window set and an inlet-side end of the servo minimum pressure valve sleeve, and a ratio of an internal diameter of the servo minimum pressure valve sleeve to the length is between 1.32 and 1.39.

* * * * *